United States Patent
Marin et al.

(10) Patent No.: US 8,681,696 B2
(45) Date of Patent: Mar. 25, 2014

(54) COORDINATING OPERATION IN INFRASTRUCTURE AND AD-HOC MODES FOR WIRELESS NETWORKS

(75) Inventors: Janne Marin, Espoo (FI); Harri Paloheimo, Helsinki (FI)

(73) Assignee: Nokia Corporation, Espoo (FI)

( * ) Notice: Subject to any disclaimer, the term of this patent is extended or adjusted under 35 U.S.C. 154(b) by 524 days.

(21) Appl. No.: 12/811,357

(22) PCT Filed: Nov. 26, 2008

(86) PCT No.: PCT/IB2008/054976
§ 371 (c)(1),
(2), (4) Date: Nov. 1, 2010

(87) PCT Pub. No.: WO2009/069091
PCT Pub. Date: Jun. 4, 2009

(65) Prior Publication Data
US 2011/0038311 A1    Feb. 17, 2011

Related U.S. Application Data

(60) Provisional application No. 60/991,213, filed on Nov. 29, 2007.

(51) Int. Cl.
*H04W 4/00* (2009.01)

(52) U.S. Cl.
USPC .......................................................... 370/328

(58) Field of Classification Search
None
See application file for complete search history.

(56) References Cited

U.S. PATENT DOCUMENTS

| 2003/0054818 A1 | 3/2003 | Bahl et al. | |
| 2004/0023652 A1* | 2/2004 | Shah et al. | 455/426.2 |
| 2004/0063458 A1 | 4/2004 | Hori et al. | |
| 2006/0073847 A1* | 4/2006 | Pirzada et al. | 455/556.2 |
| 2006/0193315 A1* | 8/2006 | Sinivaara et al. | 370/389 |
| 2006/0268793 A1* | 11/2006 | Zanaty | 370/338 |
| 2007/0115877 A1* | 5/2007 | Zhen et al. | 370/329 |
| 2007/0140191 A1* | 6/2007 | Kojima | 370/338 |
| 2007/0165555 A1 | 7/2007 | Deng et al. | |
| 2008/0095134 A1* | 4/2008 | Chen et al. | 370/342 |
| 2010/0029320 A1* | 2/2010 | Malladi et al. | 455/522 |

FOREIGN PATENT DOCUMENTS

| CN | 1661643 A | 8/2005 |
| JP | 2004254254 A | 9/2004 |
| WO | 2009/069091 A1 | 6/2009 |

OTHER PUBLICATIONS

Office Action for Chinese Application No. 200880118204.8 dated Jul. 24, 2012.
International Search Report and Written Opinion for International Application Serial No. PCT/IB2008/054976, mailed Apr. 9, 2009, 14 pages.
Gao, Xia, et al., "Optimal ATIM size for 802.11 networks in ad hoc mode", DoCoMo Communications Lab USA, INFOCOM 2006, Apr. 27, 2006, 3 pages.
International Preliminary Report on Patentability for International Application No. PCT/IB2008/054976, mailed Jun. 10, 2010, 9 pages.

* cited by examiner

*Primary Examiner* — John Blanton
(74) *Attorney, Agent, or Firm* — Alston & Bird LLP

(57) ABSTRACT

Various example embodiments are disclosed herein. In an example embodiment, an apparatus may include a controller, a memory coupled to the controller and a wireless transceiver coupled to the controller. The apparatus may be configured to receive, at a mobile station operating in Ad-Hoc mode in a wireless network, a message indicating that an access point (AP) has pending data in infrastructure network for the mobile station, and receive, at the mobile station the pending data from the AP.

26 Claims, 6 Drawing Sheets

COORDINATING OPERATION IN INFRASTRUCTURE AND AD-HOC MODES FOR WIRELESS NETWORKS

PRIORITY CLAIM

This Application is the National Stage of International Application Number PCT/IB2008/054976 filed Nov. 26, 2008 and published as International Publication Number WO2009/069091A1, which claims the benefit under U.S.C. ¶§119(e) of U.S. Provisional Patent Application No. 60/991,213, filed Nov. 29, 2007, entitled "Coordinating Operation In Infrastructure and Ad-Hoc Modes for Wireless Networks," both of which are hereby incorporated by reference.

TECHNICAL FIELD

This description relates to wireless networks.

BACKGROUND

A number of different wireless networks and technologies exist. In some wireless networks, a mobile station may operate in an Infrastructure mode in which an Access Point (AP) provides a central control point, where communications are provided between each mobile station and the AP. In some cases, mobile stations may operate in an Ad-Hoc mode (or peer level network) in which mobile stations may communicate directly with each other. Techniques are desirable that may improve the coordination of operating in an infrastructure mode and an Ad-Hoc mode.

SUMMARY

According to an example embodiment, a method may include transmitting, using Ad-Hoc mode, a message to a mobile station in a wireless network, the message indicating that there is pending data for the mobile station, and transmitting, using Infrastructure mode, the pending data to the mobile station.

According to another example embodiment, a method may include transmitting, using Ad-Hoc mode, a message to a mobile station in a wireless network, the message indicating that there is pending data in infrastructure network for the mobile station, and transmitting, using Ad-Hoc mode, the pending data to the mobile station.

In another example embodiment, an apparatus may include a controller, a memory coupled to the controller and a wireless transceiver coupled to the controller. The apparatus may be configured to transmit, using Ad-Hoc mode, a message to a mobile station in a wireless network, the message indicating that there is pending data for the mobile station, and transmit, using Infrastructure mode, the pending data to the mobile station.

According to another example embodiment, a method may include determining whether pending data for a mobile station meets a criteria, transmitting the pending data to the mobile station using Ad-Hoc mode if the pending data meets the criteria, and otherwise, if the pending data for the mobile station does not meet the criteria, performing the following: transmitting, using Ad-Hoc mode, a message to a mobile station in a wireless network, the message indicating that there is pending data for the mobile station and that the data will be transmitted using Infrastructure mode; and transmitting, using Infrastructure mode, the pending data to the mobile station.

According to another example embodiment, a method may include receiving, at a mobile station operating in Ad-Hoc mode in a wireless network, a message indicating that an access point (AP) has pending data for the mobile station, switching from Ad-Hoc mode to Infrastructure mode, and receiving, at the mobile station operating in Infrastructure mode, the pending data from the AP.

An apparatus may include a controller, a memory and a wireless transceiver. The apparatus may be configured to receive, at a mobile station operating in Ad-Hoc mode in a wireless network, a message indicating that an access point (AP) has pending data for the mobile station, switch, by the mobile station, from Ad-Hoc mode to Infrastructure mode, and receive, at the mobile station operating in Infrastructure mode, the pending data from the AP.

According to another example embodiment, an apparatus may include a controller, and a wireless transceiver, the apparatus may be configured to: transmit, from an access point using Ad-Hoc mode, a message to a mobile station in a wireless network, the message indicating that there is pending data for the mobile station and indicating a mode of transmission for the pending data.

According to another example embodiment, an apparatus may include a controller, and a wireless transceiver, the apparatus configured to: receive, at a mobile station from an access point via Ad-Hoc mode, a message indicating that there is pending data for the mobile station and indicating a mode of transmission for the pending data.

The details of one or more implementations are set forth in the accompanying drawings and the description below. Other features will be apparent from the description and drawings, and from the claims.

DETAILED DESCRIPTION

Figure 1:
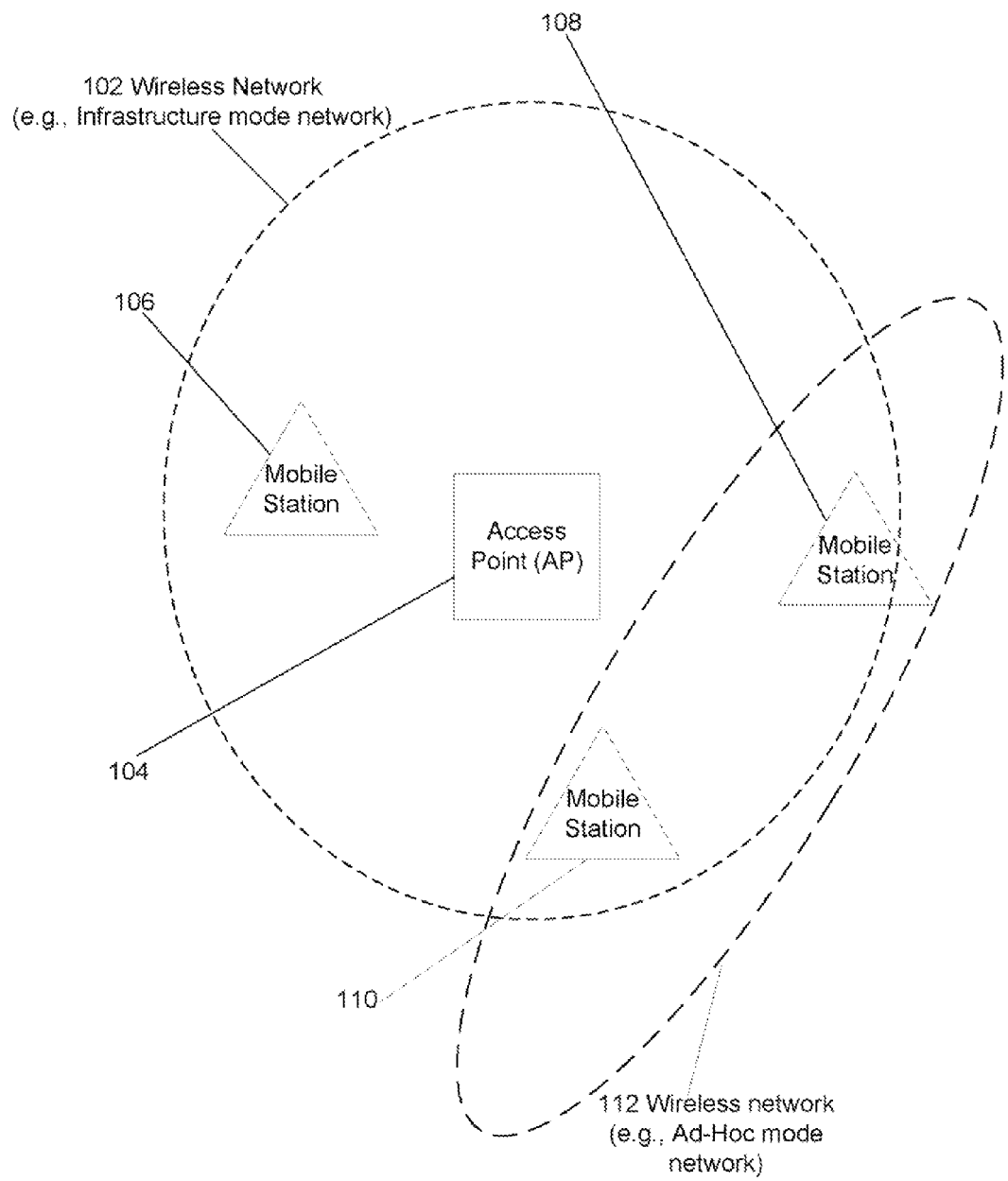
FIG. 1 is a block diagram of a wireless network according to an example embodiment.

Referring to the Figures in which like numerals indicate like elements, FIG. 1 is a block diagram of a wireless network 102 including an access point (AP) 104 and mobile stations (MS) 106, 108, 110, according to an example embodiment. In an example embodiment, network 102 may be an Infrastructure mode network, in which one or more of MS's 106, 108, and/or 110 may communicate with AP 104. In the Infrastructure mode, each of the MSs 106, 108, 110 may be associated with AP 104, and may transmit data in an uplink direction to AP 104, and may receive data in a downlink direction from AP 104, for example. Although only one AP 104 and three mobile stations (MS 106, 108 and 110) are shown, any number of APs and mobile stations may be provided in network 102. Although not shown, base station 104 may each be connected to a wired network, such as a Local Area Network, a Wide Area Network (WAN), the Internet, etc., may be coupled to one or more mesh points or mesh nodes.

In addition, referring to FIG. 1, MS 108 and 110 may be part of an Ad-Hoc (or peer level) network 112 in which these mobile stations may communicate with each other directly without communicating through the AP 104. MS 108 and MS 110 may be a member of (Infrastructure mode) wireless network 102 and/or a member of (Ad-Hoc mode) wireless network 112, and each MS 108, 110 may switch between Ad-Hoc mode and Infrastructure mode, for example.

The various embodiments described herein may be applicable to a wide variety of networks and technologies, such as WLAN networks (e.g., IEEE 802.11 type networks), IEEE 802.16 WiMAX networks, WiMedia networks, Ultra Wide Band networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links.

The term Access Point (AP) may refer to any type of infrastructure node, such as an AP, base station, node B, relay station, mesh point, etc. A mobile station may include any type of mobile station or subscriber station, such as wireless handset, PDA (wireless personal digital assistant), cell phone, an IEEE 802.11 WLAN (wireless local area network) phone, a WiMedia device, an IEEE 802.16 WiMAX device or other wireless mobile device. These are merely a few examples of the wireless devices and technologies that may be used to implement the various embodiments described herein, and this disclosure is not limited thereto.

In an example embodiment, it may be desirable for a mobile station (e.g., MS 110) to be a member of Infrastructure mode network 102 and Ad-Hoc mode network 112. MS 110 may communicate with MS 108 directly (via Ad-Hoc network 112). MS 108 may be, for example, outside the range of AP 104, or may not be compatible with one or more features/capabilities of AP 104. Thus, in this example embodiment, MS 108 may be a member of only Ad-Hoc mode network 112, while MS 110 may (e.g., at various times), be a member of both Infrastructure mode network 102 and Ad-Hoc network 112.

Also, in an example embodiment, AP 104 may operate in Infrastructure mode, e.g., as the AP for Infrastructure mode network 102. In Infrastructure mode, AP 104 may transmit a beacon, and may allow mobile stations to associate with the AP, and may schedule downlink and uplink transmissions for each associated MS.

In addition, AP 104 may also operate in Ad-Hoc mode in which the AP 104 may operate as a member of the Ad-Hoc mode network 112, for example. In Ad-Hoc mode network 112, each member wireless node (e.g., MS 108, 110 and/or AP 104) may compete to transmit a beacon (or beacon frame). After hearing the beacon from another node, the other members of the Ad-Hoc mode network may cancel their beacons and may transmit an announcement traffic indication map (ATIM) message during an ATIM window. The beacon and/or the ATIM message may indicate that the transmitting node may have pending (or waiting) data for the receiving node. For example, each (or all) nodes in the Ad-Hoc mode network 112 may wake to receive the beacon and ATIM messages to determine if other nodes in the Ad-Hoc mode network have pending data for the wireless node. If there is pending data for the wireless node, the wireless node may typically stay awake (or in full power mode) through a next beacon interval to receive the data. After receiving and acknowledging receipt of the data, the node may then be able to return to a sleep or lower power mode.

In an example embodiment, the AP 104 may include two wireless transceivers (or two radio transmitters/receivers). For example, AP 104 may include a first wireless transceiver for operating in Infrastructure mode, and a second wireless transceiver operating in Ad-Hoc mode. This may allow AP 104 to be a member of network 102 and network 112 at the same time, including communicating data (transmitting and/or receiving) at the same time for both networks 102, 112. For example, it may be desirable for high priority downlink data transmissions or larger amounts of downlink data (to a mobile station) to be transmitted by an AP while the AP and the receiving MS are operating in Infrastructure mode since the AP has control over the wireless media in such mode, and is not competing with other nodes for downlink transmission time or bandwidth.

As noted, MS 110 may be a member of both Infrastructure node network 102 and Ad-Hoc mode network 112. In an example embodiment, MS 110 may include one wireless transceiver (or one radio transmitter/receiver). Thus, from time to time, MS 110 may switch (or switch its wireless transceiver) between operating in Infrastructure mode for network 102 and Ad-Hoc mode for network 112.

A problem may arise as to how AP 104 should notify MS 110 that AP 104 has pending data to transmit to MS 110 and/or how AP 104 should transmit data to MS 110. For example, MS 110 may be spending significant time operating in Ad-Hoc mode (as part of network 112) communicating with other mobile stations, and may occasionally switch back to Infrastructure mode.

Therefore, according to an example embodiment, while in Infrastructure mode, MS 110 may send AP 104 a message (e.g., a Mode-change-announcement) informing AP 104 that MS 110 will be switching to Ad-Hoc mode. AP 104 may send back an acknowledgement (e.g., Mode-change-Ack) to acknowledge the mode change of MS 110 to Ad-Hoc mode. AP 104, as a member of Ad-Hoc Mode network 112, may listen to beacons and possible ATIM messages transmitted by MS 110, to determine that MS 110 is still (or continues to be) operating in Ad-Hoc operating mode. Thus, the Mode-change-announcement and/or the Ad-Hoc mode beacons or ATIM messages transmitted by MS 110 may indicate that MS 110 is in Ad-Hoc mode and that AP 104 may communicate with MS 110 via Ad-Hoc mode. For example, by switching from Infrastructure mode to Ad-Hoc mode, AP 104 may not typically be able to communicate with MS 110 via Infrastructure mode.

After notifying AP 104 that the MS 110 is switching from Infrastructure mode to Ad-Hoc mode, MS 110 may switch to Ad-Hoc mode. AP 104 may then receive (e.g., via a wired network or Internet not shown, or from other mobile station) data to be forwarded to MS 110. In an example embodiment, AP 104 may then notify MS 110 that AP 104 has pending data to transmit to MS 110. For example, AP 104 may send a message while both AP 104 and MS 110 are operating in Ad-Hoc mode (e.g., as part of network 112). AP 104 may send MS 110 an Ad-Hoc mode beacon and/or ATIM message, or other message, to MS 110 to notify MS 110 that AP 104 has pending or waiting data to be transmitted to MS 110. This message may even indicate the time of data transmission.

According to an example embodiment, the pending data for MS 110 may be transmitted from AP 104 either via Ad-Hoc mode or via Infrastructure mode. For example, due to the control over media by AP 104 in Infrastructure mode, data that meets a certain criteria, e.g., an amount of data larger than a threshold size, or having a high priority or high priority traffic class may be transmitted via Infrastructure mode. This may be because, higher transmission delays may be associated with Ad-Hoc mode transmissions, at least in some cases. Smaller data amounts (e.g., an amount of data less than a threshold amount), or data having a priority that is less than a threshold, for example, may be transmitted directly to the MS 110 from AP 104 via Ad-Hoc mode 112. In an example embodiment, AP 104 may then send the pending data to MS 110 via Ad-Hoc mode if the data amount is, e.g., less than a threshold amount, or lower priority data (e.g., less sensitive to delays), for example. Otherwise (e.g., if the pending data is a larger amount or higher priority traffic), for example, AP 104 may send a message (e.g., ATIM message) to MS 110 while both MS 110 and AP 104 are operating in Ad-Hoc mode. The message may indicate that AP 104 has pending data for MS 110. The message (e.g., ATIM message or beacon or other message) may even indicate that the pending data will (or should) be transmitted via Infrastructure mode, and thus, MS 110 should switch to Infrastructure mode to receive such data. MS 110 may then acknowledge this message, requesting MS 110 to switch modes.

MS 110 may, in response to such message indicating that AP 104 has pending data for MS 110, switch to Infrastructure mode, and then receive the data from AP 104. MS 110 may switch to infrastructure mode by, for example, sending an association request, and receiving an association response, from AP 104. Additional steps may be performed, such as authentication, etc. In an example embodiment, a same authentication credentials and security key(s) may be used by MS 110 to communicate for both the Infrastructure mode network 102 and Ad-Hoc mode network 112, e.g., to simplify communication in both modes.

In an example embodiment, after receiving data from AP 104, MS 110 may then send a Mode-change announcement to AP 104 (indicating that MS 110 is switching to Ad-Hoc mode), and then switch Ad-Hoc mode. MS 110 may then begin sending an Ad-Hoc mode beacon and/or ATIM message, as a member of Ad-Hoc mode network 112, for example.

Figure 2:
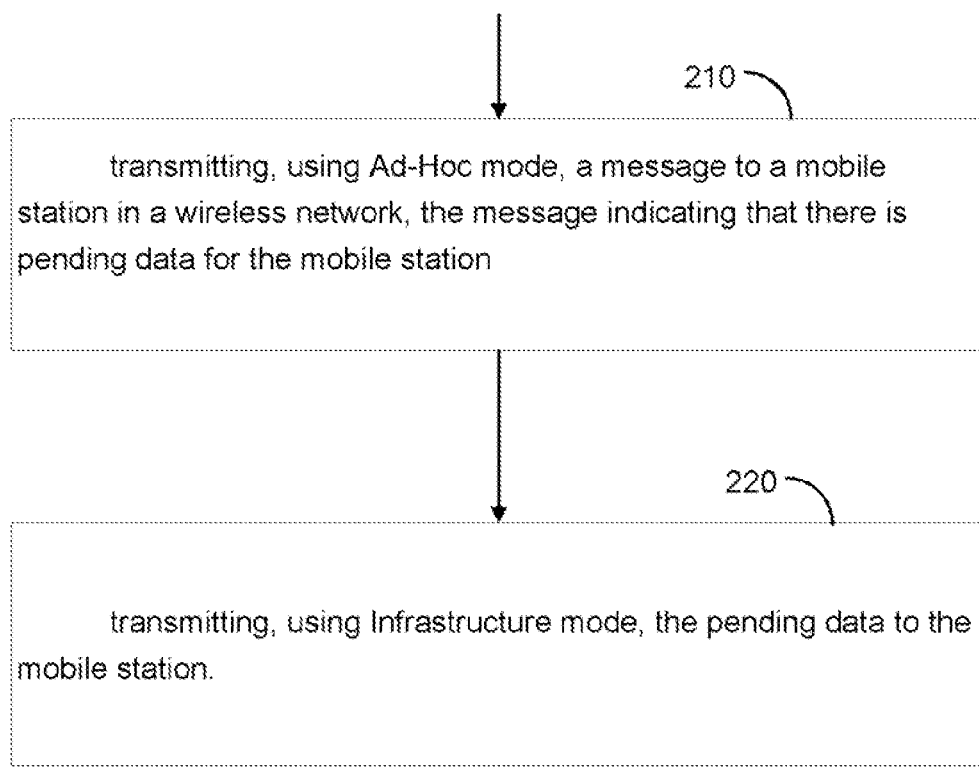
FIG. 2 is a flow chart illustrating operation of a wireless node according to an example embodiment.

FIG. 2 is a flow chart illustrating operation of a wireless node, such as an access point, according to an example embodiment. Operation 210 may include transmitting, using Ad-Hoc mode, a message to a mobile station in a wireless network, the message indicating that there is pending data for the mobile station. Operation 220 may include transmitting, using Infrastructure mode, the pending data to the mobile station.

In an example embodiment, operation 210 may include transmitting, from an access point (AP) operating in Ad-Hoc mode, a message to a mobile station in a wireless network, the message indicating that the AP has pending data for the mobile station and that the pending data will be transmitted to the mobile station using Infrastructure mode.

In an example embodiment, the message of operation 210 may include a beacon transmitted, from an access point operating in Ad-Hoc mode, to the mobile station.

In an example embodiment, the message of operation 210 may include an announcement traffic indication map (ATIM) transmitted by an access point (AP) during an ATIM window to the mobile station, e.g., in Ad-Hoc mode.

In an example embodiment, operation 220 may include transmitting, from an access point (AP) operating in Infrastructure mode, the pending data from the AP to the mobile station.

The flow chart of FIG. 2 may further include switching from an Ad-Hoc mode to an Infrastructure mode between the transmitting (210) the message and the transmitting (220) the pending data.

In an example embodiment, operation 210 may include transmitting, via a first wireless transmitter using Ad-Hoc mode, a message to a mobile station in a wireless network, the message indicating that there is pending data for the mobile station, and operation 220 may include transmitting, via a second wireless transmitter using Infrastructure mode, the pending data to the mobile station.

In another example embodiment, operation 210 may include receiving a message from the wireless node indicating that the wireless node is operating in Ad-Hoc mode, and transmitting, using Ad-Hoc mode, a message to a mobile station in a wireless network, the message indicating that there is pending data for the mobile station.

In an example embodiment, operation 220 may include receiving an association request via Infrastructure mode from the mobile station and establishing an association with the mobile station, and transmitting, using Infrastructure mode, the pending data to the mobile station.

The flow chart of FIG. 2 may further include determining that the pending data for the mobile station meets a criteria, and wherein the transmitting a message comprises transmitting, using Ad-Hoc mode in response to the determining, a message to a mobile station in a wireless network.

In an example embodiment, an apparatus may include a controller, a memory coupled to the controller, and a wireless transceiver coupled to the controller. The apparatus may be configured to: transmit, using Ad-Hoc mode, a message to a mobile station in a wireless network, the message indicating that there is pending data for the mobile station, and transmit, using Infrastructure mode, the pending data to the mobile station.

Figure 3:
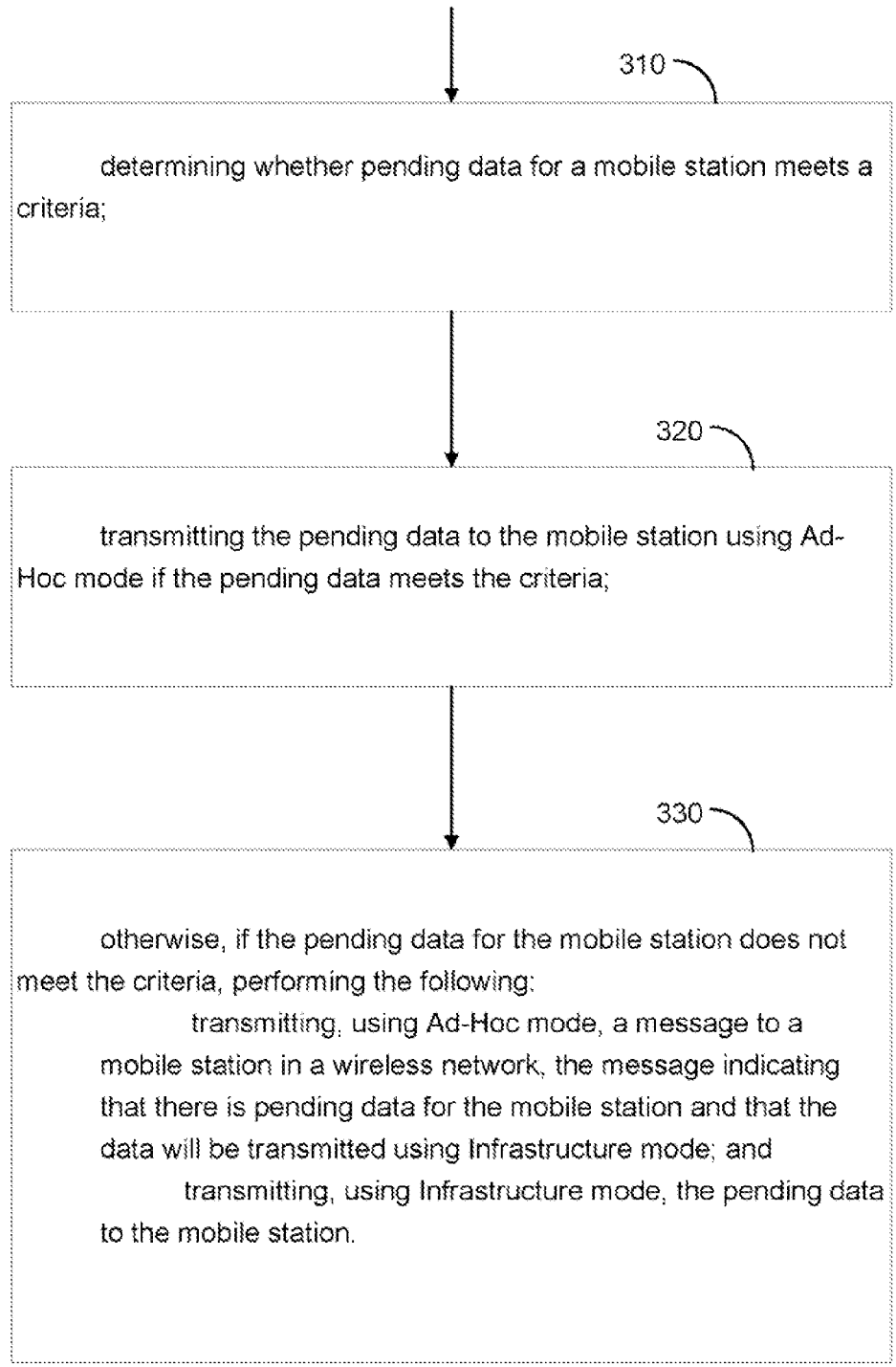
FIG. 3 is a flow chart illustrating operation of a wireless node according to another example embodiment.

FIG. 3 is a flow chart illustrating operation of a wireless node, such as an access point, according to another example embodiment. Operation 310 may include determining whether pending data for a mobile station meets a criteria. Operation 320 may include transmitting the pending data to the mobile station using Ad-Hoc mode if the pending data meets the criteria. Operation 330 may include, otherwise, if the pending data for the mobile station does not meet the criteria, performing the following: transmitting, using Ad-Hoc mode, a message to a mobile station in a wireless network, the message indicating that there is pending data for the mobile station and that the data will be transmitted using Infrastructure mode; and transmitting, using Infrastructure mode, the pending data to the mobile station.

In an example embodiment, operation 310 may include at least one of: determining if the pending data for the mobile station is less than a threshold amount (or size); or determining that the pending data for the mobile station has a priority classification that is less than a threshold.

Figure 4:
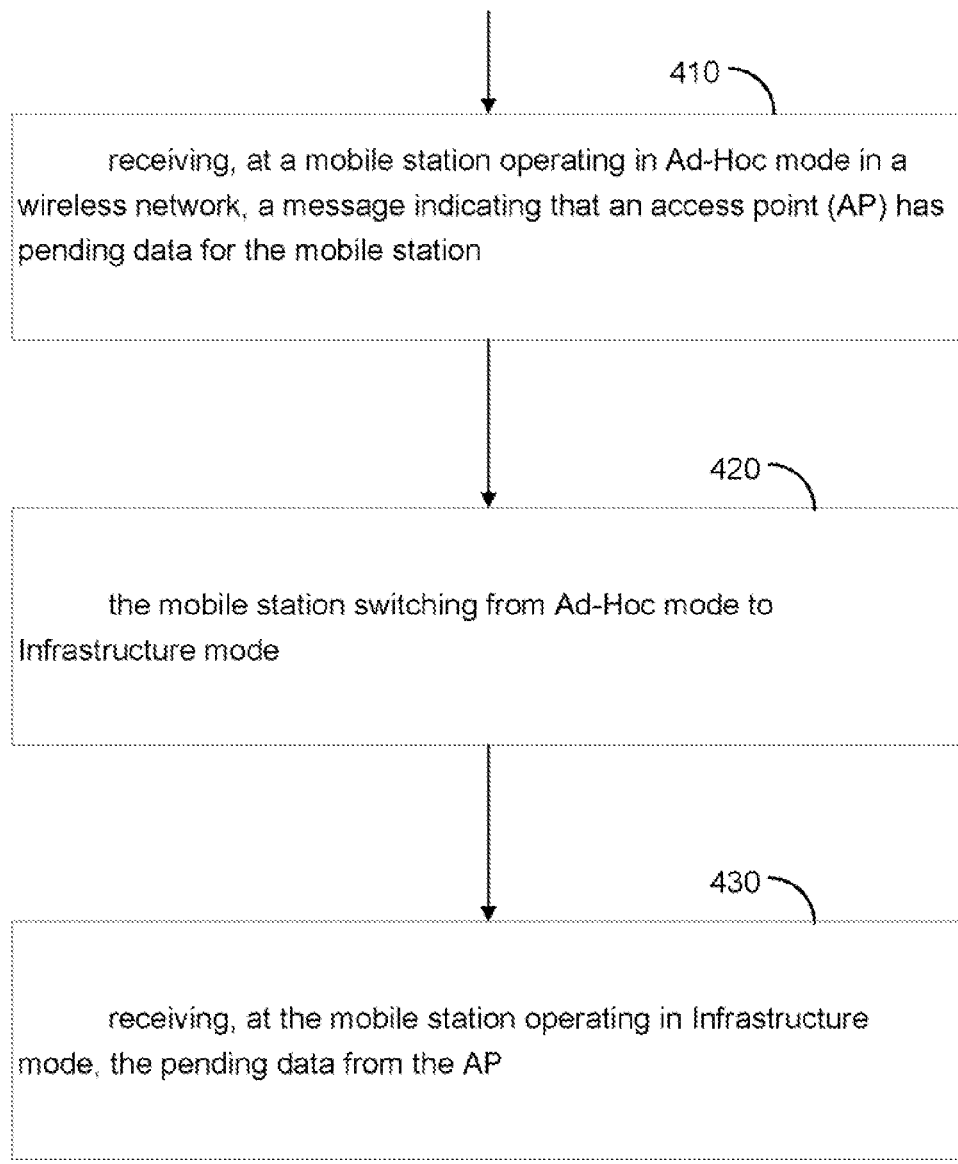
FIG. 4 is a flow chart illustrating operation of a wireless node according to another example embodiment.

FIG. 4 is a flow chart illustrating operation of a wireless node, such as a mobile station, according to an example embodiment. Operation 410 may include receiving, at a mobile station operating in Ad-Hoc mode in a wireless network, a message indicating that an access point (AP) has pending data for the mobile station. Operation 420 may include the mobile station switching from Ad-Hoc mode to Infrastructure mode. Operation 430 may include receiving, at the mobile station operating in Infrastructure mode, the pending data from the AP.

In an example embodiment, the message may indicate that the data will be sent using Infrastructure mode. In another example embodiment, the message may include a beacon transmitted, from an access point operating in Ad-Hoc mode, to the mobile station, or may include an announcement traffic indication map (ATIM) (or ATIM message) transmitted by an access point (AP) during an ATIM window to the mobile station in Ad-Hoc mode.

In another example embodiment, an apparatus may include a controller, a memory coupled to the controller, and a wireless transceiver coupled to the controller. The apparatus may be configured to: receive, at a mobile station operating in Ad-Hoc mode in a wireless network, a message indicating that an access point (AP) has pending data for the mobile station; switch, by the mobile station, from Ad-Hoc mode to Infrastructure mode; and receive, at the mobile station operating in Infrastructure mode, the pending data from the AP.

According to another example embodiment, a method may include transmitting, using Ad-Hoc mode, a message to a mobile station in a wireless network, the message indicating that there is pending data in infrastructure network for the mobile station, and transmitting, using Ad-Hoc mode, the pending data to the mobile station.

According to another example embodiment, an apparatus may include a controller (or processor), a memory coupled to the controller, and a memory. The An apparatus may be configured to (e.g., or the controller or processor may be programmed or configured to): receive, at a mobile station operating in Ad-Hoc mode in a wireless network, a message indicating that an access point (AP) has pending data for the mobile station; switch, by the mobile station, from Ad-Hoc mode to Infrastructure mode; and receive, at the mobile station operating in Infrastructure mode, the pending data from the AP.

According to another example embodiment, an apparatus may include a controller, and a wireless transceiver, the apparatus configured to: transmit, from an access point using Ad-Hoc mode, a message to a mobile station in a wireless network, the message indicating that there is pending data for the mobile station and indicating a mode of transmission for the pending data.

In an example embodiment, the message may indicate that the pending data will be transmitted via Ad-Hoc mode to the mobile station. The apparatus may be further configured to transmit from the access point the pending data to the mobile station via Ad-Hoc mode.

In an example embodiment, the message may indicate that the pending data will be transmitted via Infrastructure mode to the mobile station. The apparatus may be further configured to transmit from the access point the pending data to the mobile station via Infrastructure mode.

In an example embodiment, the apparatus being configured to transmit may include the apparatus being configured to: determine whether the pending data for the mobile station meets a priority or size criteria; transmit, from the access point using Ad-Hoc mode, a message to the mobile station indicating that there is pending data for the mobile station, the message also indicating that the pending data will be transmitted from the access point to the mobile station either via Infrastructure mode if the pending data for the mobile station meets the priority or size criteria, or via the Ad-Hoc mode if the pending data for the mobile station does not meet the priority or size criteria; and transmit the pending data from the access point to the mobile station using either Ad-Hoc mode or Infrastructure mode as indicated in the message.

According to another example embodiment, an apparatus may include a controller, and a wireless transceiver, the apparatus configured to: receive, at a mobile station from an access point via Ad-Hoc mode, a message indicating that there is pending data for the mobile station and indicating a mode of transmission for the pending data.

In an example embodiment, the message may indicate that the pending data will be transmitted to the mobile station via Ad-Hoc mode, the apparatus further configured to receive the pending data from the access point via Ad-Hoc mode.

In an example embodiment, the message may indicate that the pending data will be transmitted to the mobile station via Infrastructure mode, the apparatus further configured to switch from Ad-Hoc mode to Infrastructure mode, and receive the pending data from the access point via Infrastructure mode.

Figure 5:
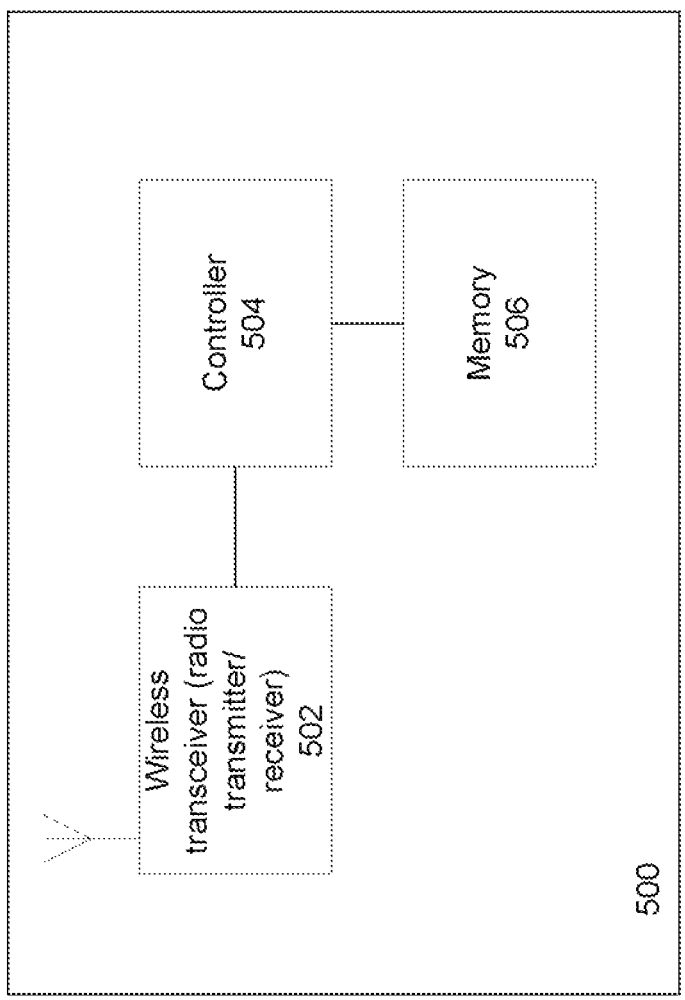
FIG. 5 is a block diagram of a wireless node according to an example embodiment.

FIG. 5 is a block diagram of a wireless node (e.g., mobile station or AP) according to an example embodiment. The wireless node 500 may include a wireless transceiver 502, a controller 504, and a memory 506. For example, some operations illustrated and/or described herein, may be performed by a controller 504, under control of software or firmware.

Figure 6:
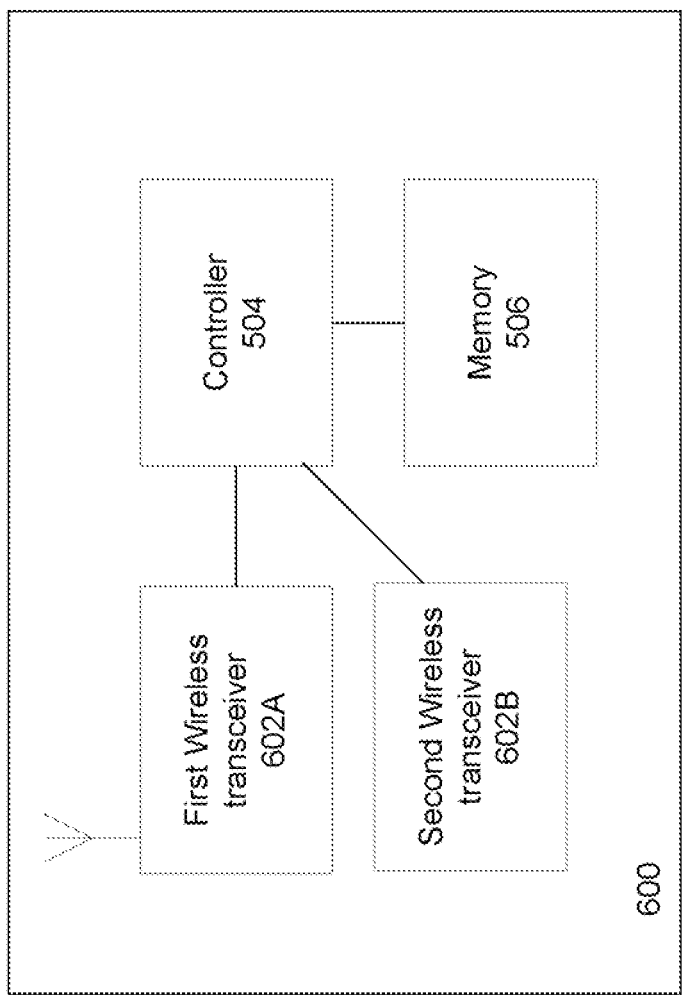
FIG. 6 is a block diagram of a wireless node according to another example embodiment.

FIG. 6 is a block diagram of a wireless node (e.g., AP) 600 according to an example embodiment. The wireless node 600 is very similar to wireless node 500, but may include two (or a plurality of) wireless transceivers, such as a first wireless transceiver 602A, and a second wireless transceiver 602B, which may allow a node (e.g., AP or Base station) to operate in both Infrastructure node (e.g., via transceiver 602A) and Ad-Hoc mode (e.g., via transceiver 602B), at the same time.

In addition, a storage medium may be provided that includes stored instructions, which when executed by a controller or processor may result in a controller, or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising at least a processor, a memory in communication with said processor and having computer coded instructions stored therein, said instructions when executed by the processor causing the apparatus to:
cause transmission, from an access point via Ad-Hoc mode, of a message to a mobile station in a wireless network, the message indicating that there is pending data for the mobile station and indicating a mode of transmission for the pending data.

2. The apparatus of claim 1 wherein the message indicates that the pending data will be transmitted via Ad-Hoc mode to the mobile station;
the apparatus being further configured to transmit from the access point the pending data to the mobile station via Ad-Hoc mode.

3. The apparatus of claim 1 wherein the message indicates that the pending data will be transmitted via Infrastructure mode to the mobile station;
the apparatus being further configured to transmit from the access point the pending data to the mobile station via Infrastructure mode.

4. The apparatus of claim 1 wherein the apparatus being configured to transmit comprises the apparatus being configured to:
determine whether the pending data for the mobile station meets a priority or size criteria;
transmit, from the access point using Ad-Hoc mode, a message to the mobile station indicating that there is pending data for the mobile station, the message also indicating that the pending data will be transmitted from the access point to the mobile station either via Infrastructure mode if the pending data for the mobile station meets the priority or size criteria, or via the Ad-Hoc mode if the pending data for the mobile station does not meet the priority or size criteria; and
transmit the pending data from the access point to the mobile station using either Ad-Hoc mode or Infrastructure mode as indicated in the message.

5. An apparatus comprising at least a processor, a memory in communication with said processor and having computer coded instructions stored therein, said instructions when executed by the processor causing the apparatus to:
receive, at a mobile station from an access point via Ad-Hoc mode, a message indicating that there is pending data for the mobile station and indicating a mode of transmission for the pending data.

6. The apparatus of claim 5 wherein the message indicates that the pending data will be transmitted to the mobile station via Ad-Hoc mode, the apparatus being further configured to receive the pending data from the access point via Ad-Hoc mode.

7. The apparatus of claim 5 wherein the message indicates that the pending data will be transmitted to the mobile station via Infrastructure mode, the apparatus further configured to switch from Ad-Hoc mode to Infrastructure mode, and receive the pending data from the access point via Infrastructure mode.

8. A method comprising:
causing transmission, using Ad-Hoc mode, of a message to a mobile station in a wireless network, the message indicating that there is pending data for the mobile station; and
causing transmission, using Infrastructure mode, of the pending data to the mobile station.

9. The method of claim 8 wherein the transmission, using Ad-Hoc mode, of a message to a mobile station comprises causing transmission, from an access point (AP) operating in Ad-Hoc mode, of a message to a mobile station in a wireless network, the message indicating that the AP has pending data for the mobile station and that the pending data will be transmitted to the mobile station using Infrastructure mode.

10. The method of claim 8 wherein the message comprises a beacon transmitted, from an access point operating in Ad-Hoc mode, to the mobile station.

11. The method of claim 8 wherein the message comprises an announcement traffic indication map (ATIM) transmitted by an access point (AP) during an ATIM window to the mobile station in Ad-Hoc mode.

12. The method of claim 8 wherein the transmission, using Infrastructure mode, of the pending data to the mobile station comprises causing transmission, from an access point (AP) operating in Infrastructure mode, of the pending data from the AP to the mobile station.

13. The method of claim 8 and further comprising switching from an Ad-Hoc mode to an Infrastructure mode between the transmitting a message and the transmitting the pending data.

14. The method of claim 8 wherein:
the transmitting a message comprises causing transmission, via a first wireless transmitter using Ad-Hoc mode, of a message to a mobile station in a wireless network, the message indicating that there is pending data for the mobile station; and causing transmission, via a second wireless transmitter using Infrastructure mode, of the pending data to the mobile station.

15. The method of claim 8 wherein the transmission of a message comprises:
   receiving a message from the wireless node indicating that the wireless node is operating in Ad-Hoc mode; and
   causing transmission, using Ad-Hoc mode, of a message to a mobile station in a wireless network, the message indicating that there is pending data for the mobile station.

16. The method of claim 8 wherein the transmission of the pending data comprises:
   receiving an association request via Infrastructure mode from the mobile station and establishing an association with the mobile station; and
   causing transmission, using Infrastructure mode, of the pending data to the mobile station.

17. The method of claim 8 and further comprising:
   determining that the pending data for the mobile station meets a criteria; and
   wherein the transmission of a message comprises causing transmission, using Ad-Hoc mode in response to the determining, of a message to a mobile station in a wireless network.

18. The method of claim 8 wherein the determining that the pending data for the mobile station meets a criteria comprises determining that the pending data for the mobile station is greater than a threshold amount.

19. An apparatus comprising at least a processor, a memory in communication with said processor and having computer coded instructions stored therein, said instructions when executed by the processor causing the apparatus to:
   cause transmission, using Ad-Hoc mode, of a message to a mobile station in a wireless network, the message indicating that there is pending data for the mobile station; and
   cause transmission, using Infrastructure mode, of the pending data to the mobile station.

20. A method comprising:
   determining whether pending data for a mobile station meets a criteria;
   causing transmission of the pending data to the mobile station using Ad-Hoc mode if the pending data meets the criteria;
   otherwise, if the pending data for the mobile station does not meet the criteria, performing the following:
      causing transmission, using Ad-Hoc mode, of a message to a mobile station in a wireless network, the message indicating that there is pending data for the mobile station and that the data will be transmitted using Infrastructure mode; and
      causing transmission, using Infrastructure mode, of the pending data to the mobile station.

21. The method of claim 20 wherein the determining whether pending data for a mobile station meets a criteria comprises at least one of:
   determining that the pending data for the mobile station is less than a threshold amount; or
   determining that the pending data for the mobile station has a priority classification that is less than a threshold.

22. A method comprising:
   receiving, at a mobile station via Ad-Hoc mode in a wireless network, a message from an access point indicating that the access point (AP) has pending data for the mobile station;
   the mobile station switching from Ad-Hoc mode to Infrastructure mode; and
   receiving, at the mobile station operating in Infrastructure mode, the pending data from the AP.

23. The method of claim 22 wherein the message also indicates that the data will be sent using Infrastructure mode.

24. The method of claim 22 wherein the message comprises a beacon transmitted, from an access point operating in Ad-Hoc mode, to the mobile station.

25. The method of claim 22 wherein the message comprises an announcement traffic indication map (ATIM) transmitted by an access point (AP) during an ATIM window to the mobile station.

26. An apparatus comprising at least a processor, a memory in communication with said processor and having computer coded instructions stored therein, said instructions when executed by the processor causing the apparatus to:
   receive, at a mobile station via Ad-Hoc mode in a wireless network, a message from an access point indicating that the access point (AP) has pending data for the mobile station;
   switch, by the mobile station, from Ad-Hoc mode to Infrastructure mode; and
   receive, at the mobile station operating in Infrastructure mode, the pending data from the AP.

* * * * *

UNITED STATES PATENT AND TRADEMARK OFFICE
CERTIFICATE OF CORRECTION

PATENT NO. : 8,681,696 B2  Page 1 of 1
APPLICATION NO. : 12/811357
DATED : March 25, 2014
INVENTOR(S) : Marin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this

Twenty-ninth Day of September, 2015

Michelle K. Lee
*Director of the United States Patent and Trademark Office*